Aug. 9, 1932.  F. R. DETRICK  1,870,673
ROAD SCRAPER
Filed July 3, 1930  3 Sheets-Sheet 1
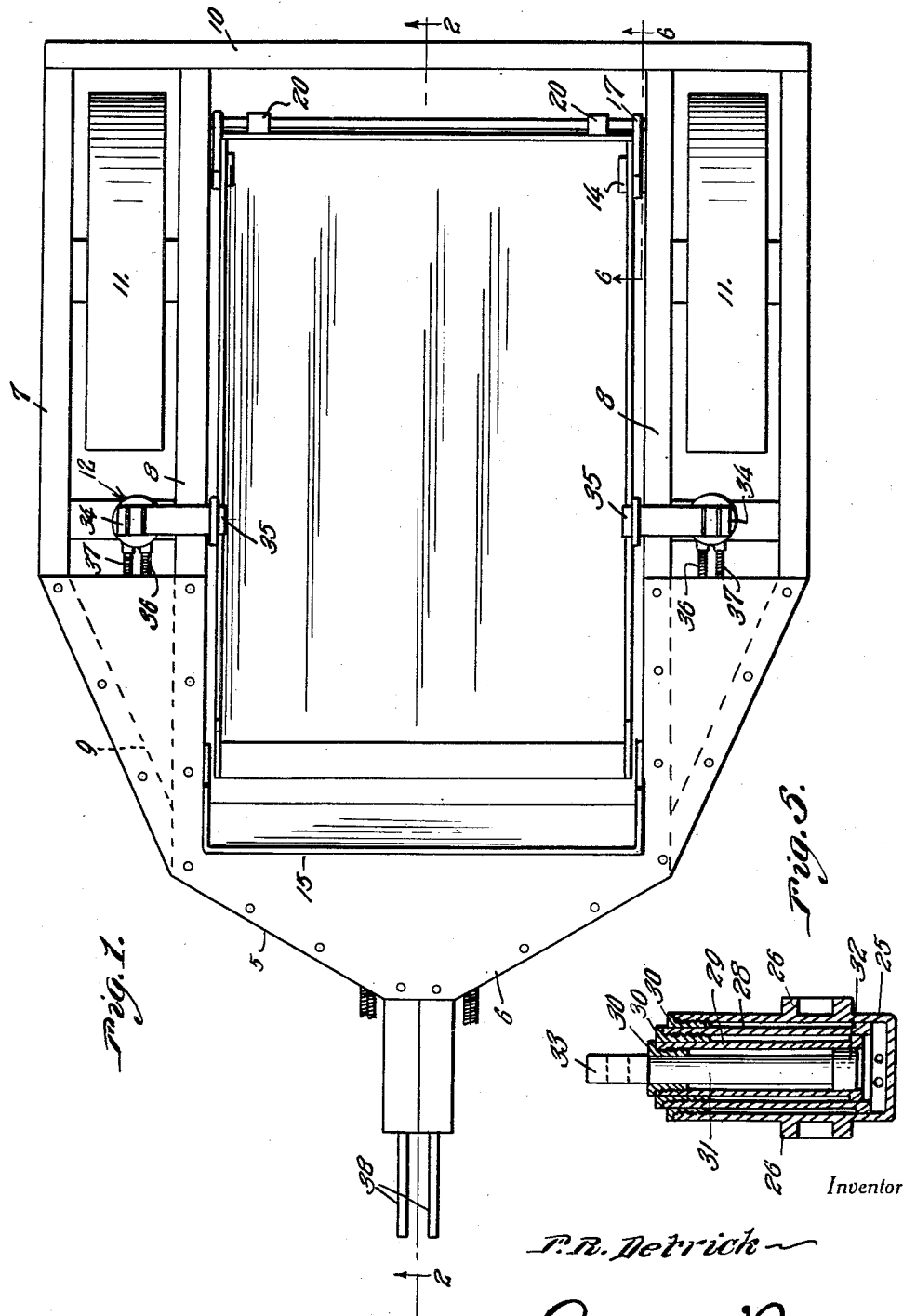
Inventor
F. R. Detrick
By Clarence A. O'Brien
Attorney

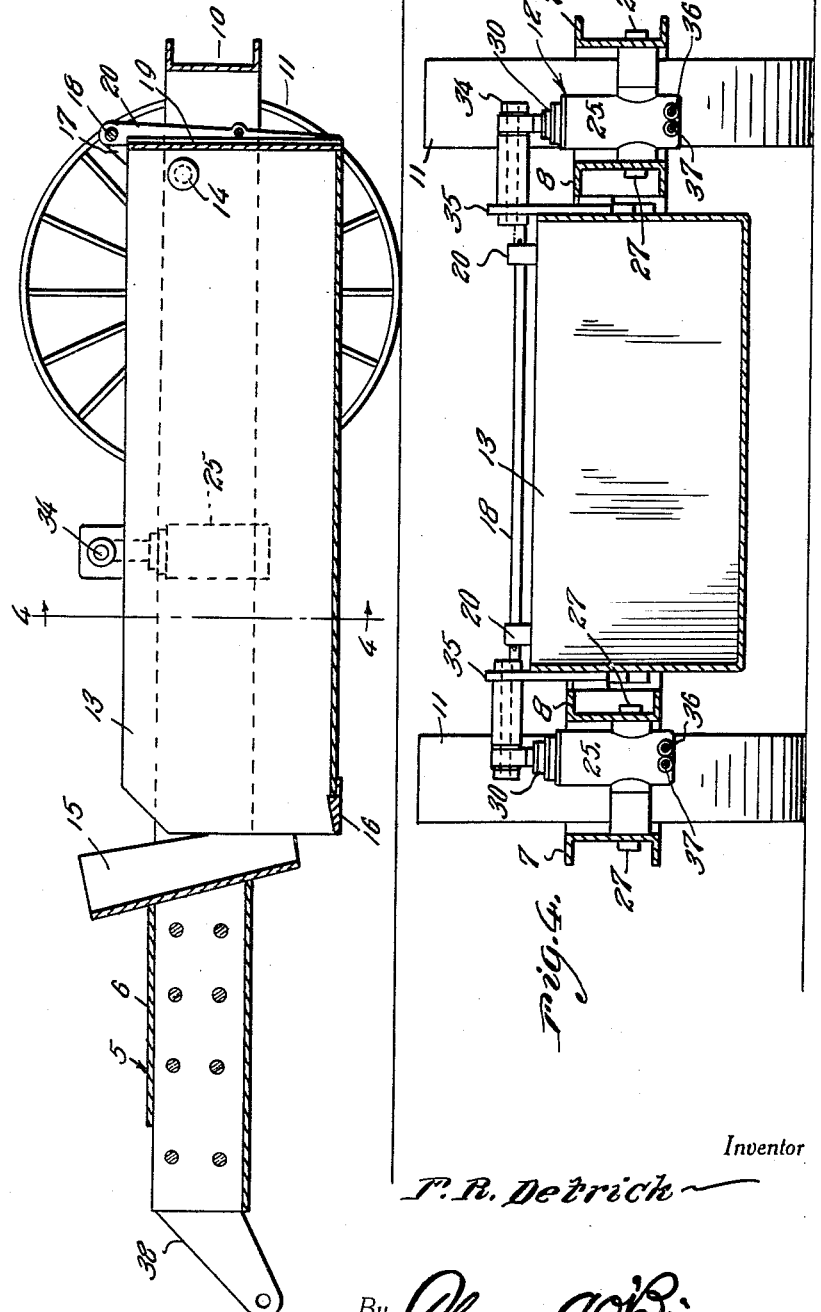

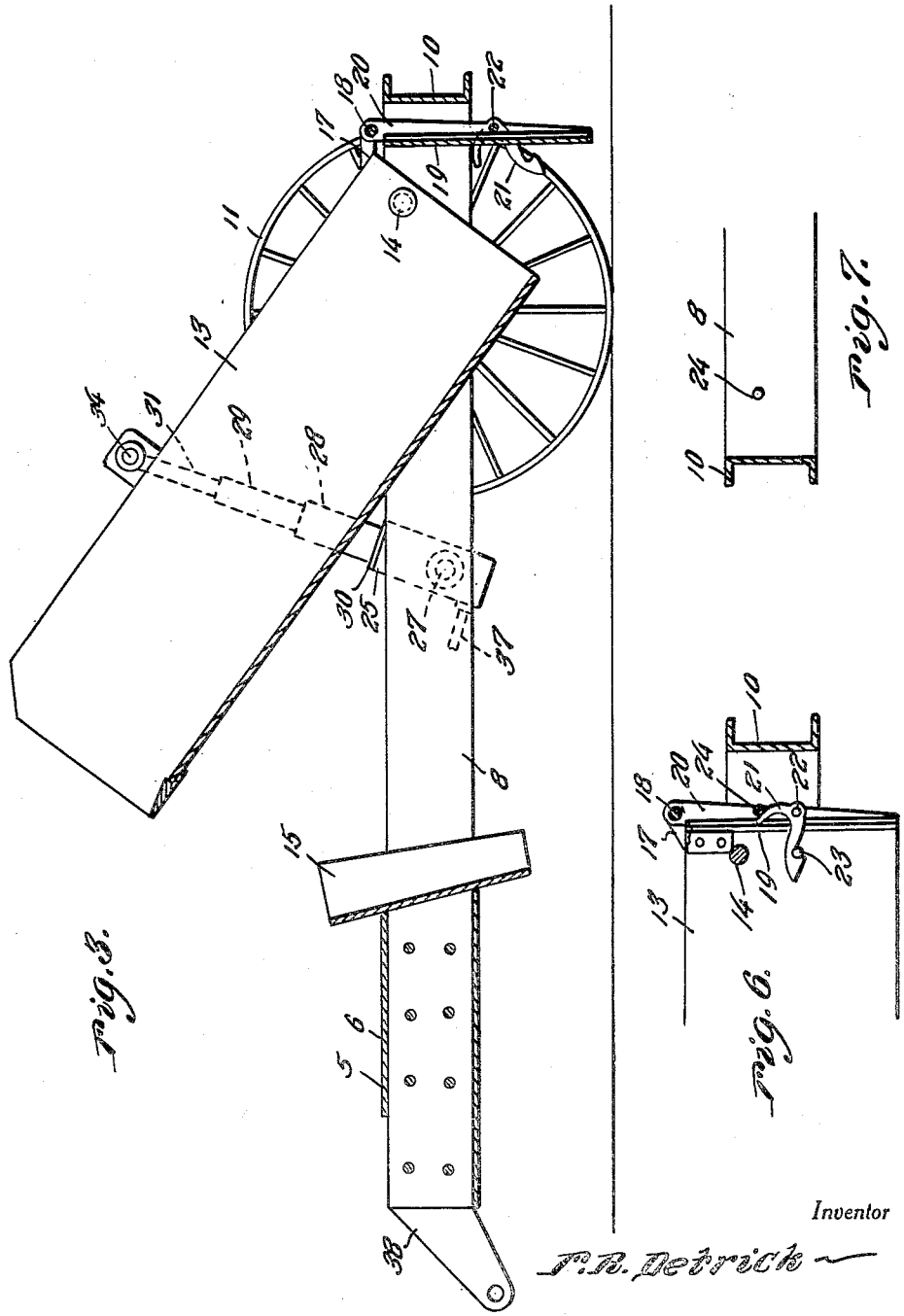

Patented Aug. 9, 1932

1,870,673

UNITED STATES PATENT OFFICE

FORREST R. DETRICK, OF WORTHINGTON, OHIO

ROAD SCRAPER

Application filed July 3, 1930. Serial No. 465,704.

This invention appertains to new and useful improvements in road scrapers, and more particularly to a road scraper provided with hydraulic means whereby the scoop can be adjusted, either to a road engaging position or to a dumping position.

The principal object of this invention is to provide a road scraper capable of being manipulated with ease, thus saving labor and the expense incident thereto.

During the course of the following specification and claim, other important objects and advantages of the invention will readily become apparent to the reader.

In the drawings:—

Figure 1 represents a top plan view of the novel scraper.

Fig. 2 represents a longitudinal sectional view through the scraper taken substantially on the line 2—2 of Fig. 1.

Fig. 3 is a sectional view similar to that shown in Fig. 2, but showing the scoop in dumping position.

Fig. 4 represents a cross sectional view taken substantially on the line 4—4 of Fig. 2.

Fig. 5 is a vertical sectional view through one of the hydraulic cylinders.

Fig. 6 represents a sectional view taken substantially on the line 6—6 of Fig. 1.

Fig. 7 is a fragmentary sectional view through the rear bar of the frame.

Referring to the drawings wherein like numerals designate like parts, it can be seen that the scraper mechanism is of the type to be drawn by a tractor or other power driven vehicle, and includes a frame generally referred to by numeral 5.

This frame 5 includes a substantially U-shaped construction 6 at the forward end of the frame to the leg portions of which the wheel frame are secured, said wheel frame comprising a channel bar 7 and an inner channel bar 8. The forward end of each of these outer channel bars 7 is disposed obliquely as at 9 so as to be coincident with the U-shaped construction 6. The rear ends of the inner and outer bars 7 and 8 of each wheel frame are connected by the rear channel bar 10.

Within each wheel frame, a relative wide wheel 11 is mounted. Within each of the wheel frames and forwardly of the corresponding wheel 11 is a hydraulic cylinder generally referred to by numeral 12 and this forms an important factor of this invention. As is clearly shown in Fig. 3, and 1, the scoop 13 is supported at its rear end on the fulcrum 14, which simply consists of a pivotal connection between each side wall of the scoop and the adjacent inner bar 8.

A U-shaped shield plate 15 is mounted within the U-shaped construction 6 and in closely spaced relation with this shield plate terminates the forward open end of the scoop, which is equipped with the removable blade 16. An arm 17 projects rearwardly from each side wall of the scoop 13 for rotatably supporting the rod 18 to which the end gate 19 is secured by the shanks 20.

As is clearly shown in Fig. 6 and also shown in Fig. 3, an S-shaped latch member 21 is provided at each end of the gate 19, the S-shaped latch member being rockably supported as at 22, with one end hooked to engage the pin 23 on the adjacent side wall of the scoop 13 while its opposite end normally engages the pintle 24, projecting inwardly from the corresponding inner bar 8 of the adjacent wheel frame.

At this point it can be seen that when the scoop is elevated to the illustration in Fig. 3, the latch members 21 will press against the pintles 24, to relieve their opposite ends from the pins 23, thus permitting the gate to swing backwardly as shown in Fig. 3, to release the load from the scoop.

Each of the hydraulic cylinders is constructed on the telescopic principal, including a main cylinder 25. This cylinder 25, has a socket construction 26 and a pair of diametrically opposite points on its opposite sides for receiving suitable trunnions 27 whereby the cylinder is swingably supported.

Slidably disposed within the cylinder 25, are the telescopic sleeves 28 and 29, both of which are provided with outwardly disposed circumferentially extending shoulders at their inner ends, and abutments 30 for abutting the said shoulders when the sleeves are in extended position, it being noted that the main cylinder 25 is also provided with one of these removable abutments 30. The innermost abutment 30 is in the form of a bushing through which the piston rod 31 is slidable, the same being provided with a piston 32 at its inner end. The outer end of the rod 31 is provided with an eye 33 for connection to the pin 34, projecting laterally from the arm 35 on the scoop.

Each of the cylinders 25 is equipped with outlets 36 and 37, for compressed fluid. Suitable draft members 38 project from the forward portion of the frame 5, to permit a tractor to be attached thereto.

Obviously, by activating the cylinders 12 to the desired degree, the proper adjustment of the scoop can be obtained, either to the extent of engaging the same with the ground, or elevating the same to a dumping position.

While the foregoing specification sets forth the invention in definite terms, it is to be understood that numerous changes in the shape, size, and materials may be resorted to without departing from the spirit and scope of the invention as claimed hereinafter.

Having thus described my invention, what I claim as new is:—

A scraper of the character described comprising a wheeled frame, a scoop pivotally connected at its rear end portion to the said frame, an upstanding ear on each side of the scoop, a jack at each side of the scoop interposed between the frame and the adjacent ear on the scoop, and a dump gate at the rear end of the said scoop.

In testimony whereof I affix my signature.

FORREST R. DETRICK.